(12) United States Patent
Harkness et al.

(10) Patent No.: US 7,757,248 B2
(45) Date of Patent: Jul. 13, 2010

(54) DETECTION OF MEDIA LINKS IN BROADCAST SIGNALS

(75) Inventors: David H. Harkness, Wilton, CT (US);
Daozheng Lu, Dunedin, FL (US);
William A. Feininger, Palm Harbor, FL (US); Craig M. Smithpeters, Roswell, GA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 12/181,910

(22) Filed: Jul. 29, 2008

(65) Prior Publication Data

US 2008/0282303 A1 Nov. 13, 2008

Related U.S. Application Data

(63) Continuation of application No. 09/955,691, filed on Sep. 19, 2001, now Pat. No. 7,421,723, which is a continuation-in-part of application No. 09/226,521, filed on Jan. 7, 1999, now abandoned.

(51) Int. Cl.
*H04H 20/14* (2008.01)
*H04H 60/29* (2008.01)

(52) U.S. Cl. ............................... 725/22; 725/9; 725/11; 725/14; 725/15; 725/16; 725/17; 725/18; 725/19; 725/20; 725/51; 725/112; 725/115; 725/136; 725/32; 725/34; 725/35; 725/36

(58) Field of Classification Search .................... 725/9, 725/11, 14–20, 51, 112, 115, 22, 136, 32, 725/34–36
See application file for complete search history.

(56) References Cited

U.S. PATENT DOCUMENTS

| 4,025,851 | A | 5/1977 | Haselwood et al. |
| 4,230,990 | A | 10/1980 | Lert, Jr. et al. |
| 4,677,466 | A | 6/1987 | Lert, Jr. et al. |
| 4,697,209 | A | 9/1987 | Kiewit et al. |
| 4,857,999 | A | 8/1989 | Welsh |
| 5,020,142 | A | 5/1991 | Shirasaka |
| 5,481,294 | A | 1/1996 | Thomas et al. |

(Continued)

FOREIGN PATENT DOCUMENTS

EP 0854645 7/1998

OTHER PUBLICATIONS

IPEA, Written Opinion for PCT/US02/29435, Nov. 3, 2003, 6 pages.

(Continued)

*Primary Examiner*—Jason P Salce
(74) *Attorney, Agent, or Firm*—Hanley, Flight & Zimmerman, LLC

(57) ABSTRACT

A detection apparatus includes a tuner tuned to the program and a meter coupled to the tuner and arranged to detect content ancillary information from the program tuned by the tuner. The content ancillary information may be a media link, closed captioning information, or the like. The meter may also be arranged to extract a broadcast signature from the program. A comparator compares the broadcast signature to a reference signature selected from a library of reference signatures based upon the content ancillary information. Broadcast signatures from unknown programs may be clustered at least partially on the basis of the content ancillary information.

11 Claims, 5 Drawing Sheets

U.S. PATENT DOCUMENTS

| | | | |
|---|---|---|---|
| 5,481,296 | A | 1/1996 | Cragun et al. |
| 5,485,518 | A | 1/1996 | Hunter et al. |
| 5,594,934 | A | 1/1997 | Lu et al. |
| 5,621,454 | A | 4/1997 | Ellis et al. |
| 5,629,739 | A | 5/1997 | Dougherty |
| 5,675,510 | A | 10/1997 | Coffey et al. |
| 5,774,664 | A | 6/1998 | Hidary et al. |
| 5,790,977 | A | 8/1998 | Ezekiel |
| 5,796,952 | A | 8/1998 | Davis et al. |
| 5,819,156 | A | 10/1998 | Belmont |
| 5,870,754 | A | 2/1999 | Dimitrova et al. |
| 5,872,588 | A | 2/1999 | Aras et al. |
| 5,884,301 | A | 3/1999 | Takano |
| 5,926,207 | A | 7/1999 | Vaughan et al. |
| 5,929,849 | A | 7/1999 | Kikinis |
| 5,931,912 | A | 8/1999 | Wu et al. |
| 5,974,299 | A | 10/1999 | Massetti |
| 6,025,837 | A | 2/2000 | Matthews et al. |
| 6,035,177 | A | 3/2000 | Moses et al. |
| 6,058,430 | A | 5/2000 | Kaplan |
| 6,061,056 | A | 5/2000 | Menard et al. |
| 6,061,719 | A | 5/2000 | Bendinelli et al. |
| 6,097,383 | A | 8/2000 | Gaughan et al. |
| 6,115,680 | A | 9/2000 | Coffee et al. |
| 6,163,316 | A | 12/2000 | Killian |
| 6,167,436 | A | 12/2000 | Yamane et al. |
| 6,199,206 | B1 | 3/2001 | Nishioka et al. |
| 6,215,483 | B1 | 4/2001 | Zigmond |
| 6,219,042 | B1 | 4/2001 | Anderson et al. |
| 6,229,532 | B1 | 5/2001 | Fujii |
| 6,240,555 | B1 * | 5/2001 | Shoff et al. ............... 725/110 |
| 6,263,505 | B1 | 7/2001 | Walker et al. |
| 6,317,885 | B1 | 11/2001 | Fries |
| 6,326,982 | B1 | 12/2001 | Wu et al. |
| 6,349,410 | B1 | 2/2002 | Lortz |
| 6,374,404 | B1 | 4/2002 | Brotz et al. |
| 6,381,748 | B1 | 4/2002 | Lin et al. |
| 6,418,169 | B1 | 7/2002 | Datari |
| 6,510,152 | B1 | 1/2003 | Gerszberg et al. |
| 6,510,462 | B2 | 1/2003 | Blumenau |
| 6,522,770 | B1 | 2/2003 | Seder et al. |
| 6,647,548 | B1 | 11/2003 | Lu et al. |
| 6,684,254 | B1 | 1/2004 | Dutta |
| 6,694,042 | B2 | 2/2004 | Seder et al. |
| 6,694,043 | B2 | 2/2004 | Seder et al. |
| 6,917,724 | B2 | 7/2005 | Seder et al. |
| 2004/0058675 | A1 | 3/2004 | Lu et al. |
| 2004/0133927 | A1 | 7/2004 | Sternberg et al. |
| 2008/0288972 | A1 | 11/2008 | Lu et al. |

OTHER PUBLICATIONS

ISA, International Search Report for PCT/US02/29435, Apr. 3, 2003, 6 pages.

Office Action, mailed Jan. 19, 2004, Argentine Application No. P020103514, 1 page.

Office Action, mailed Oct. 15, 2008, Canadian Application No. 2,293,957, 2 pages.

Office Action, mailed May 10, 2002, U.S. Appl. No. 09/226,521, 11 pages.

Office Action, mailed Sep. 5, 2003, U.S. Appl. No. 09/226,521, 15 pages.

Office Action, mailed Nov. 6, 2002, U.S. Appl. No. 09/226,521, 13 pages.

Office Action, mailed Jun. 2, 2006, U.S. Appl. No. 09/955,691, 21 pages.

Decision on Appeal, mailed Feb. 28, 2007, U.S. Appl. No. 09/955,691, 11 pages.

Notice of Allowance, mailed Apr. 30, 2008, U.S. Appl. No. 09/955,691, 8 pages.

Office Action, mailed Mar. 4, 2008, U.S. Appl. No. 09/955,691, 7 pages.

Office Action, mailed Apr. 7, 2004, U.S. Appl. No. 09/955,691, 14 pages.

Office Action, mailed May 30, 2007, U.S. Appl. No. 09/955,691, 3 pages.

Office Action, mailed Aug. 1, 2003, U.S. Appl. No. 09/955,691, 12 pages.

Office Action, mailed Aug. 11, 2005, U.S. Appl. No. 09/955,691, 11 pages.

Office Action, mailed Aug. 20, 2007, U.S. Appl. No. 09/955,691, 8 pages.

International Preliminary Examination Report, mailed Aug. 27, 2004, PCT/US02/29435, 11 pages.

European Patent Office, Supplementary European Search Report issued in connection with European Patent Application No. 02766287.3, dated Dec. 10, 2009, 3 pages.

Office action, mailed October 19, 2009, Canadian Application No. 2,293,957, 3 pages.

* cited by examiner

DETECTION OF MEDIA LINKS IN BROADCAST SIGNALS

RELATED APPLICATION

This patent arises from a continuation of U.S. patent application Ser. No. 09/955,691, filed Sep. 19, 2001, which is, in turn, a continuation-in-part of U.S. patent application Ser. No. 09/226,521, which was filed on Jan. 7, 1999. U.S. patent application Ser. No. 09/955,691 is hereby incorporated herein by reference.

FIELD OF THE DISCLOSURE

The present invention relates to detection of media links (such as URLs) which are embedded in programs that are transmitted by television and/or radio signal transmission sources, such as television and/or radio networks, local broadcasters, cable operators, video servers, Web sites, and the like.

BACKGROUND

As used herein, programs mean commercials, regular programming material, documentaries, and/or the like, which are transmitted for reception by televisions, radios, computers, and other equipment provided with video and/or audio tuners. Also as used herein, media links include URLs embedded in video and/or audio, surrogate URLs, or any other links in video and/or audio that link a content recipient to content provided by a content provider (such as a Web site) or to content provided elsewhere in the video and/or audio whether such content is stored in cache or not. A surrogate URL, for example, may be an ASCII or other code that is embedded in content and that may be used to look up an URL for linking to content. An example of a media link that links a content recipient to content provided elsewhere in the video and/or audio is a trigger that, when received from the video and/or audio, causes content, which was previously transmitted in the video and/or audio and cached by the receiver, to be displayed to the content recipient.

Programs are transmitted by transmission sources through the use of satellites, over the air by way of transmitting antennas, or over cables such as wires or optical fibers. These transmission sources can be networks, local broadcasters, satellite broadcasters, video servers, Web sites, cable programmers, and the like.

It is frequently desirable to detect the transmission of programs by the transmission sources. For example, in preparing program rating reports, the receivers of statistically selected panelists are metered in order to determine at least (i) the channels to which the receivers are tuned and (ii) the times during which the receivers are tuned to those channels. The resulting tuning data are extrapolated over the population as a whole, or over relevant segments of this population, in order to report ratings. However, because the identities of programs carried in the channels reported in the tuning data cannot always be inferred from the tuning data, it is necessary to determine, or at least verify, the identity of the programs transmitted in the channels and during the times covered by the tuning data.

As another example, advertisers often desire to verify certain information regarding the transmission of their commercials by transmission sources. This information includes a verification (i) that the commercials were actually transmitted, (ii) that the commercials were transmitted in their entirety, and (iii) that the commercials were transmitted in the correct time slots and in the correct channels. This information allows advertisers to determine whether they received the value for which they contracted with the relevant transmission sources.

As yet another example, advertisers often desire to ascertain the advertising strategies of competitors. These advertising strategies may be discerned from the types of advertisements run by competitors, the competitors' expenditures on such advertisements, the media chosen to carry such advertisements, and the like.

Accordingly, systems have been developed in order to identify transmitted programs. For example, in connection with reporting program ratings, a program verification system known as the AMOL (Automated Monitoring of Line-up) program verification system is operated by the assignee of the present invention. In this AMOL program verification system, a code is inserted into the vertical blanking interval of programs. Monitoring equipment at sites located in relevant geographical areas read the AMOL codes from transmitted programs and detect the channels in which these programs are transmitted as well as the times during which these programs are transmitted. Accordingly, the AMOL program verification system is able to verify that particular programs were transmitted in corresponding particular channels, during corresponding particular time slots, and for particular corresponding amounts of time. The verified program/channel relationship, coupled with the channel tuning data acquired from the receivers of the statistically selected panelists, are used to determine the programs to which these receivers were tuned.

As another example, the assignee of the present invention operates a service known as the Monitor Plus service in which sets of commercial monitoring equipment are placed in selected geographical monitoring areas. The sets of commercial monitoring equipment tune to each of the channels available in the corresponding geographical areas and extract broadcast signatures from commercials carried in these channels. The channels, times, and dates of the broadcast signature extractions are also noted. The extracted broadcast signatures are compared to previously extracted reference signatures. In each geographical monitoring area, these reference signatures are stored in a reference signature library along with identification information regarding the commercials from which the reference signatures were extracted.

Because there are typically many reference signatures stored in a reference signature library, and because comparing the broadcast signatures to all such reference signatures would require a substantial amount of time, hash codes are used to focus the search such that the search finds only those reference signatures which are potential matches to the broadcast signatures. The hash codes are computed from one or more characteristics, such as luminance, of the broadcast signatures so that only those reference signatures producing similar hash codes within some range are compared to the broadcast signatures.

When broadcast signatures match reference signatures, the identities of the transmitted commercials are known from the identity information stored with the matching reference signatures. Also, the channels, times, and dates of commercial transmissions are known from the matching broadcast signatures. The sets of monitoring equipment can also detect the length of the commercial as transmitted by comparing multiple broadcast signatures and multiple reference signatures extracted from the same commercial. Accordingly, reports can be generated that permit advertisers to verify that their commercials have been run in the channels, on the days, in the time slots, and for the durations desired, and/or to permit advertisers to ascertain the advertising strategies of their competitors.

When broadcast signatures do not match reference signatures, however, it may be possible that a new commercial has been transmitted for which there are no reference signatures stored in the library. In this case, the extracted broadcast signatures corresponding to each possibly new commercial are stored for later transmission to a central facility where the possibly new commercial is viewed and identified by an attendant. This viewing and identification process is usually referred to as new commercial labeling. Once identified, the new commercial's broadcast signatures are converted to reference signatures and are stored in the reference signature libraries.

Clustering is performed in each geographical monitoring area so that a geographical monitoring area does not send the same new commercial multiple times to the central facility for new commercial discovery. During clustering in a geographical monitoring area, the broadcast signatures of each possibly new commercial are compared to the broadcast signatures of the other possibly new commercials in order to detect duplicates. Duplicates are not transmitted to the central facility. Accordingly, the efficiency of new commercial discovery is increased because only one instance of each possibly new commercial is transmitted to, and processed by, the central facility. However, because an instance of a possibly new commercial may be received at the central facility from more than one geographical monitoring area, clustering is again performed at the central facility prior to each initiation of new commercial discovery.

Furthermore, it is expected that other appliances, such as computers and set top boxes, will be equipped with tuners so that these appliances can display video and/or audio, such as television and/or radio programs. It is also expected that this video and/or audio will contain media links. Accordingly, if a user of a computer, digital television, set top box, or other video and/or audio receiving device is viewing a program of interest, and desires to access other information associated with the program, the user can click on the program. Clicking on the program will cause a media link, which is embedded in the program, to be sent back to a Web site or other content provider with the result that additional information will be downloaded to the user's appliance. In the case where the media links are self-activating, such as where the media link is a trigger, clicking on the program need not be required. Instead, the media link, when detected by the video, audio, and/or data receiving device, automatically causes the display of ancillary content which, for example, may have been previously transmitted in the video, audio, and/or data signal and cached in the receiving device or in auxiliary equipment.

Because these media links will likely uniquely identify the programs in which they are used, the present invention is directed to an arrangement for detecting these media links in order to determine the identities of the programs in which the media links are embedded. Accordingly, the present invention is useful in an AMOL type system, a Monitor Plus type system, or in other systems in which the identity of a transmitted program is desired.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
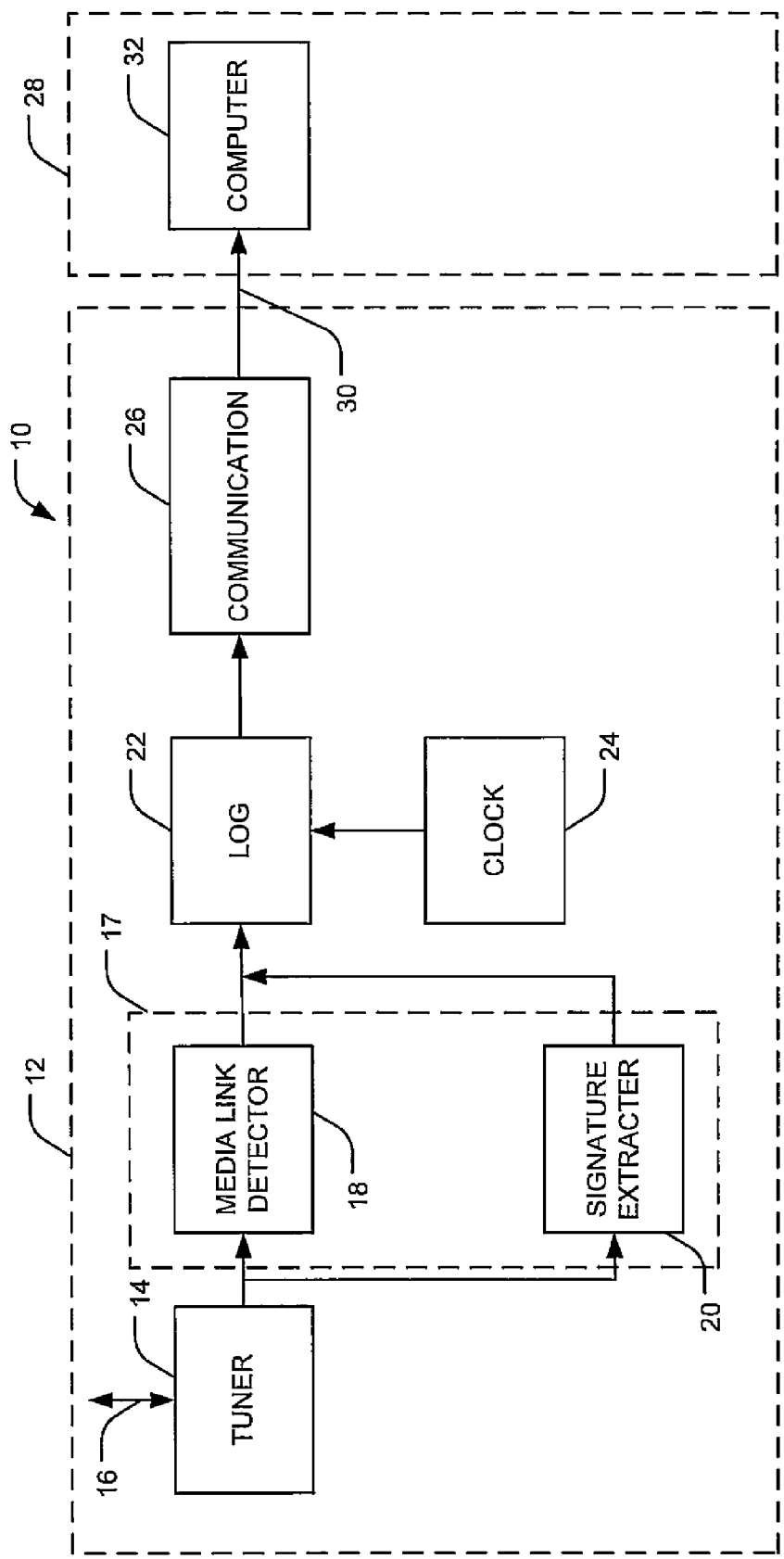
FIG. 1 illustrates an example metering system having monitoring equipment located at a monitoring site and a central facility located remotely from the monitoring site.

As shown in FIG. 1, monitoring equipment 10 is located at a monitoring site 12 and includes a tuner 14 which tunes to a channel contained in a signal received by a signal acquisition device 16. The signal acquisition device 16 may be a modem, a satellite dish or other antenna, or the like and acquires signals transmitted by transmission sources. The signal carried in the channel to which the tuner 14 is tuned is supplied to a meter 17 which includes a media link detector 18 and a signature extractor 20. The media link detector 18 is arranged to detect media links in a manner which is similar to present metering equipment that detect other ancillary codes, such as AMOL codes. In the present case, however, the media link detector 18 is arranged to decode the signal carried in the channel to which the tuner 14 is tuned in order to detect a media link. When the media link detector 18 detects a media link, it causes the media link to be stored in a log 22.

In the event that a media link is not contained in a program which is carried in the channel to which the tuner 14 is tuned, the signature extractor 20 extracts one or more broadcast signatures from the program. Broadcast signatures are likewise stored in the log 22. Signatures may be extracted in a manner disclosed in U.S. Pat. No. 4,677,466. This patent discloses example conditions which initiate signature extraction. However, although specific conditions are disclosed, it should be understood that other conditions may be used to initiate signature extraction. For example, a signature may be extracted from each nth frame of a program. Moreover, any suitable techniques may be used to collect the data that form the signatures.

A clock 24 is associated with the log 22 so that the time and date that each media link is detected by the media link detector 18 may be stored along with the corresponding media link. Similarly, the time and date that each broadcast signature is extracted by the signature extractor 20 may be stored along with the broadcast signature. Also, the channel to which the tuner 14 is tuned at the time that a media link is detected by the media link detector 18 or a signature is extracted by the signature extractor 20 may be stored in the log 22 along with the corresponding media link or broadcast signature.

Periodically, the data stored in the log 22 is transmitted by communication equipment 26 from the monitoring site 12 to a remotely located central facility 28 over a communication medium 30. The communication equipment 26 may be arranged to periodically transmit the data stored in the log 22 to the central facility 28. Alternatively, the communication equipment 26 may be arranged to transmit the data stored in the log 22 when the log 22 has a predetermined amount of data stored therein. As a still further alternative, the communication equipment 26 may be arranged to respond to polls from the central facility 28 in order to initiate the transfer of data to the central facility 28. Still other alternatives and combinations of alternatives are possible.

The communication medium 30 may be any communication medium which supports the transfer of information between remote locations. For example, the communication medium 30 may be a public telephone network, air accessed by radiating antennas such as satellite, cellular, and terrestrial antennas, over cables such as the RF return over a cable plant, the Internet, or the like.

A computer 32 is located at the central facility 28. The computer 32 may be arranged to identify programs from the media links and broadcast signatures transmitted to it by the communication equipment 26. For example, in the case of media links, the computer 32 may be arranged to compare the media links received from the monitoring site 12 to a library of media links which contain both the media links and the titles and/or other identifying information corresponding to the programs from which the media links were detected by the media link detector 18. Accordingly, when the computer 32 is provided with a media link from the monitoring site 12, it can identify and/or verify the program which contains that media link and which was transmitted by a transmission source. The computer 32 can also determine, if desired, that the program containing the media link was transmitted at a particular time, on a particular day, and on a particular channel from the channel, time, and date information transmitted to the central facility 28 along with the detected media link.

In some cases, the programs may be completely identified from the media link itself. In this case, there is no need to use the look up table in the identification process. In other cases, particularly where a program has been transmitted for the first time, no information is provided in the look up table from which the program may be identified. In this case, the media link may be used to access the Web site or content associated with the media link in order to discover the identity of the program, or the program may be viewed by personnel of the central facility 28 in order to discover the identity of the program. Then, the identity of the program may be entered into the look up table under the media link for future identifications.

The computer 32 may also be arranged to identify and/or verify programs which do not contain media links. For example, the computer 32 may be arranged to compare the broadcast signatures received from the monitoring site 12 to a library of reference signatures which contain both the reference signatures and the titles and/or other identifying information corresponding to the programs from which the reference signatures were extracted. Accordingly, when the computer 32 is provided with broadcast signatures from the monitoring site 12, it can identify programs and/or verify the transmission of programs by matching these broadcast signatures with the reference signatures stored in the reference signature library. The computer 32 can also determine, if desired, that the programs containing the extracted broadcast signatures were transmitted at particular times, on particular days, and on particular channels from the channel, time, and date information transmitted to the central facility 28 along with the extracted broadcast signatures.

Alternatively, the computer 32 may use both detected media links and extracted broadcast signatures, where available from the same program, in order to increase certainty that a program is properly identified and/or verified. As a still further alternative, the computer 32 may identify and/or verify a program from the media links in the event that the computer 32 is unable to first identify and/or verify the program from the extracted broadcast signatures.

Figure 2:
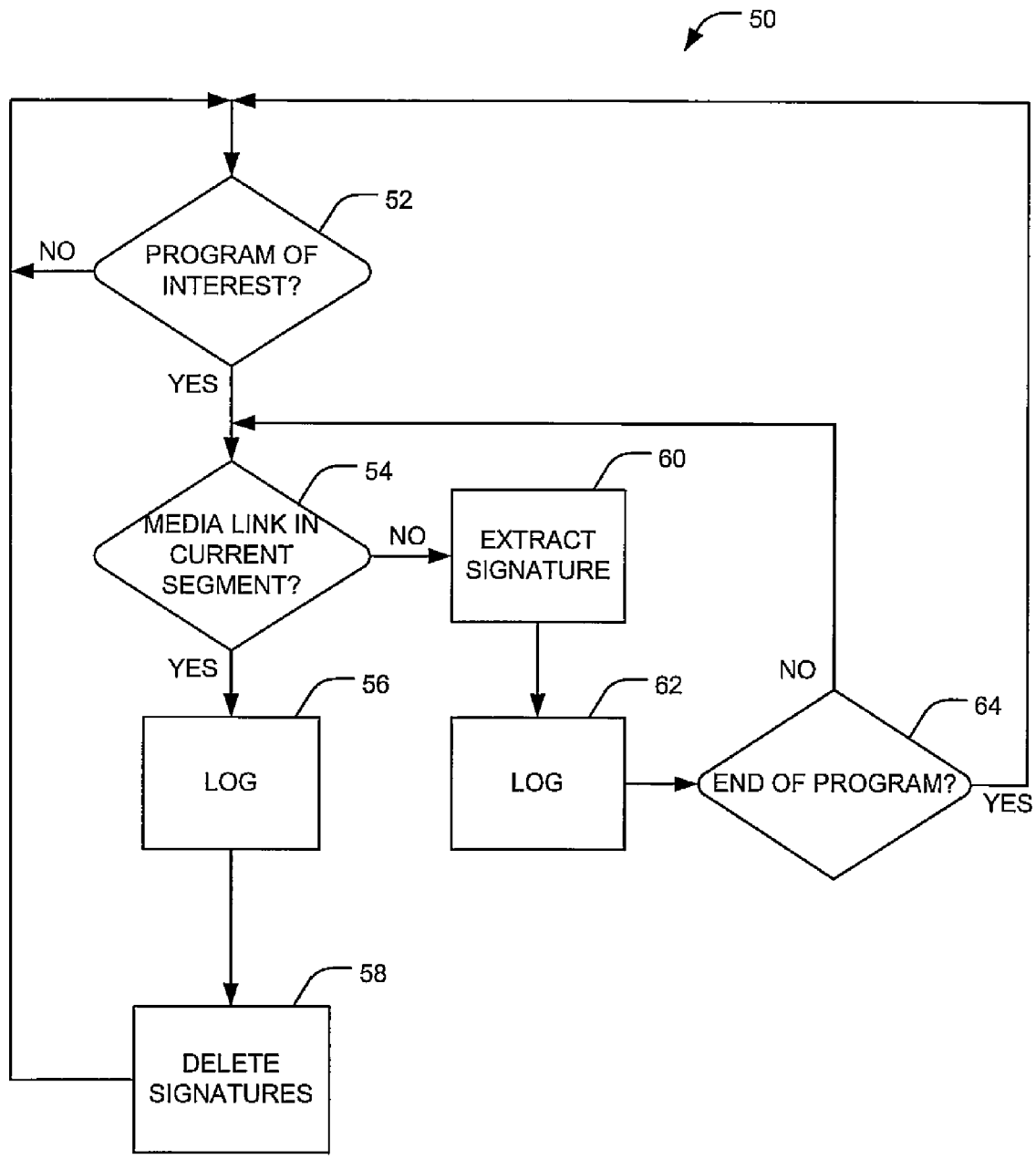
FIG. 2 illustrates in flow chart form one embodiment of a program that may be executed by the monitoring equipment at the monitoring site of FIG. 1.

The meter 17 operates in accordance with a software routine 50 shown in FIG. 2. The software routine 50, at a block 52, determines from the output of the tuner 14 whether a program of interest is received. For example, the software routine 50 at the block 52 may operate in accordance with the above mentioned U.S. Pat. No. 4,677,466 in order to determine the start of a program of interest. (Alternatively, the software routine 50 at the block 52 may be arranged to simply detect when the tuner 14 is on and is tuned to a channel in which there is content. In this case, the output of the tuner 14 is continuously monitored for media links, and broadcast signatures are extracted from the output of the tuner 14 on a continuous basis.) A program of interest may be a commercial, regular programming material, a documentary, and/or the like.

If a program of interest is not detected at the block 52, the software routine 50 waits for a program of interest. However, if a program of interest is detected, the software routine 50 at a block 54 determines whether a media link is detected by the media link detector 18 from a segment of the current program. For example, this segment may have a determinate length, such as n frames of the current program. Alternatively, this segment may have an indeterminate length determined by conditions of the program signal as disclosed in the above mentioned U.S. Pat. No. 4,677,466.

If a media link is detected from the current segment of the current program at the block 54, the media link is logged at a block 56. Because a media link is detected in the program of interest, it may not be necessary to save any broadcast signatures which may have been extracted from the current program prior to the time at which the media link is detected. If so, the software routine 50 at a block 58 deletes from the log only the broadcast signatures extracted by the signature extractor 20 from the current program, and program flow thereafter returns to the block 52 to wait for the next program of interest.

On the other hand, if a media link is not detected from the current segment of the current program at the block 54, the software routine 50 at a block 60 extracts a broadcast signature from the current program appearing at the output of the tuner 14. The software routine 50 at a block 62 logs the broadcast signature extracted by the signature extractor 20 at the block 60.

The software routine 50 then determines at a block 64 whether an end to the current program is detected. For example, the software routine 50 at the block 52 may operate in accordance with the above mentioned U.S. Pat. No. 4,677,466 in order to determine the end of the current program. If an end to the current program is not yet detected, program flow returns to the block 54 in order to search for a media link from the next segment of the current program.

On the other hand, if an end of the current program is detected at the block 64, program flow returns to the block 52 in order to process a next program. In this case, the current program contained no media link and the current program will be identified by the computer 32 from the extracted broadcast signatures.

Instead of identifying a program from a media link, the media link may be used to better focus the search for reference signatures which match broadcast signatures. This use of a media link is particularly valuable in those instances where the media link is not unique, i.e., where the media link is used in more than one program and, therefore, does not uniquely identify a program. In addition to a media link, other information which is ancillary to the program content contained in the program signal, such as closed captioning information, may be used for this reference signature search focusing. Accordingly, media links, closed captioning information, or other such ancillary information may be referred to herein as content ancillary information (CAI).

Figure 3:
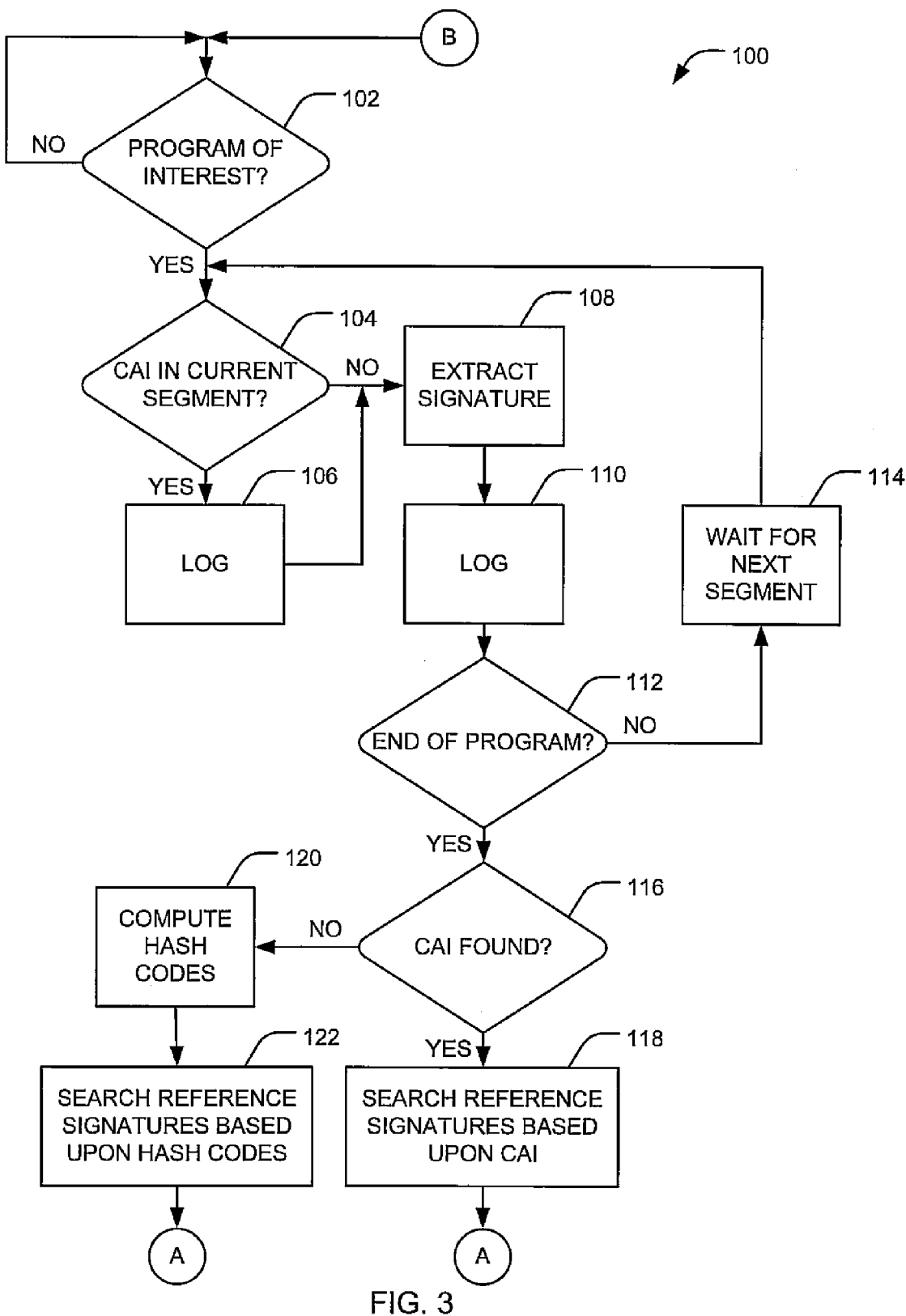
FIGS. 3 and 4 illustrate in flow chart form an alternative embodiment of a program that may be executed by the monitoring equipment at the monitoring site of FIG. 1; and, FIG. 5 illustrates in flow chart form a clustering program that may be executed by the monitoring equipment at the monitoring site and/or by the computer at the central facility of FIG. 1.
Figure 4:
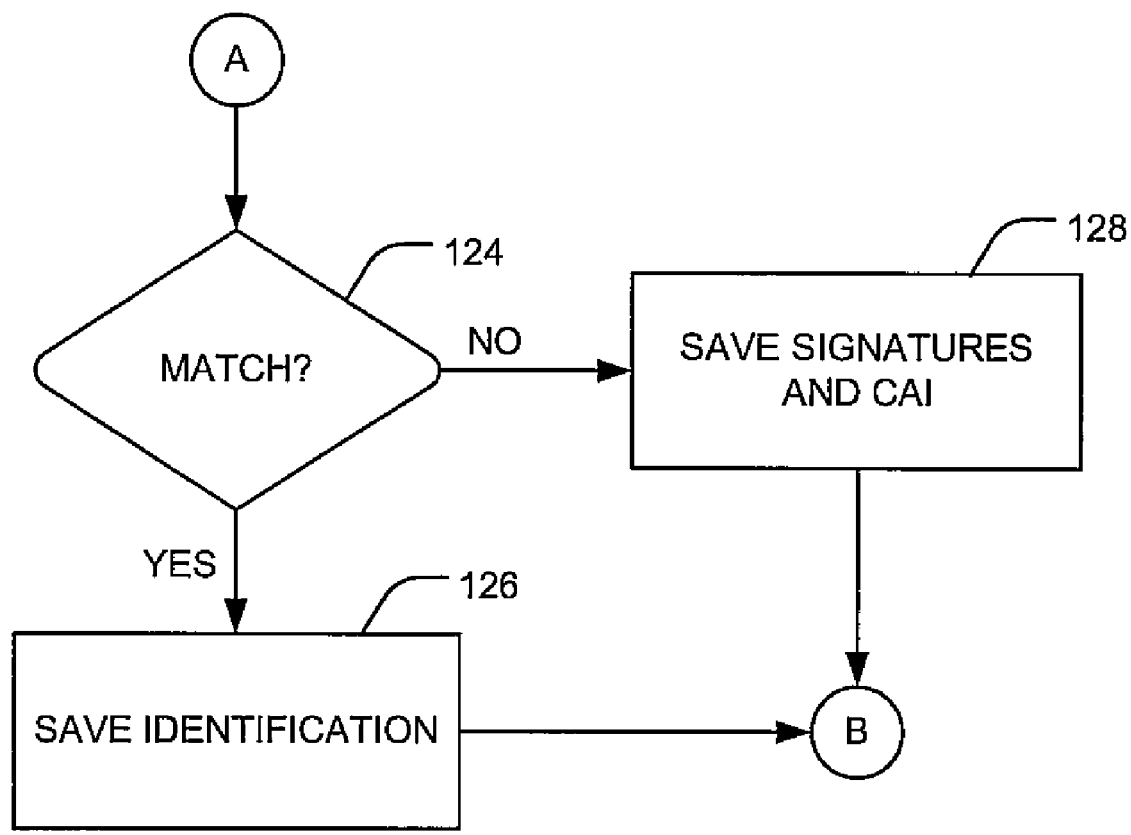

A software routine 100, which is illustrated in FIGS. 3 and 4, uses content ancillary information in order to focus the search for reference signatures that are to be compared to broadcast signatures during the process of identifying a program. The communication equipment 26 may employ, in addition to a transmitter, a computer in order to execute the software routine 100.

The software routine 100, at a block 102, determines from the output of the tuner 14 whether a program of interest is received, as before. If a program of interest is not detected at the block 102, the software routine 100 waits for a program of interest. However, if a program of interest is detected, the software routine 100 at a block 104 determines whether content ancillary information is detected by the media link detector 18 from a segment of the current program. If content ancillary information is detected from the current segment of the current program at the block 104, the content ancillary information is logged at a block 106.

On the other hand, if content ancillary information is not detected from the current segment of the current program at the block 104, or after the content ancillary information is logged at a block 106, the software routine 100 at a block 108 extracts a broadcast signature from the current segment of the current program. The software routine 100 at a block 110 logs the broadcast signature extracted by the signature extractor 20 at the block 108.

The software routine 100 then determines at a block 112 whether an end to the current program is detected. If an end to the current program is not yet detected, the software routine 100 at a block 114 waits for the next segment. When the next segment occurs, program flow returns to the block 104. When the end of a current program is detected at the block 112, a set of broadcast signatures has been extracted and stored for that program. Also, content ancillary information, if detected, is also stored for that program. This set of broadcast signatures is compared to reference signatures stored in a reference signature library as described below in an attempt to identify the program corresponding to this set of broadcast signatures.

Thus, if an end of the current program is detected at the block 112, the software routine 100 at a block 116 determines whether content ancillary information was detected in the program just processed by the blocks 102-114. If content ancillary information was detected in the program just processed by the blocks 102-114, a search of the reference signatures stored in the reference signature library is made at a block 118 in order to find reference signatures corresponding to the content ancillary information. Such reference signatures were previously extracted from a program containing the same content ancillary information and were loaded into the reference signature library in association with the corresponding content ancillary information.

If content ancillary information was not detected in the program just processed by the blocks 102-114, hash codes corresponding to the broadcast signatures extracted at the block 108 may be computed at a block 120. A search of the reference signatures stored in the reference signature library is made at a block 122 in order to find reference signatures corresponding to the hash codes computed at the block 120. (Alternatively, the broadcast signatures extracted at the block 108 may be compared to all reference signatures in the reference signatures library.)

The reference signatures found at the block 118 or at the block 122 are compared at a block 124 to the broadcast signatures extracted from the program at the block 108. If a sufficient match is found at the block 124, the identification of the program stored in the reference signature library along with the matching reference signatures is saved at a block 126 for later transmission to the central facility 28. The time at which the program was received, the length of the program as detected, the channel in which the program was detected, and other relevant information may also be stored at the block 126 along with the program identification.

If a match is not found at the block 124, the broadcast signatures extracted from the program at the block 108 and the content ancillary information, if any, for the program are saved at a block 128 for later clustering and transmission to the central facility 28 so that the program can be identified during new program discovery. The time at which the program was received, the length of the program as detected, the channel in which the program was detected, and other relevant information may also be stored at the block 128 along with the broadcast signatures extracted at the block 108 and the content ancillary information, if any, detected at the block 104. After the identification is saved at the block 126, or after the broadcast signatures and content ancillary information are saved at the block 128, program flow returns to the block 102 to process the next program of interest.

Figure 5:
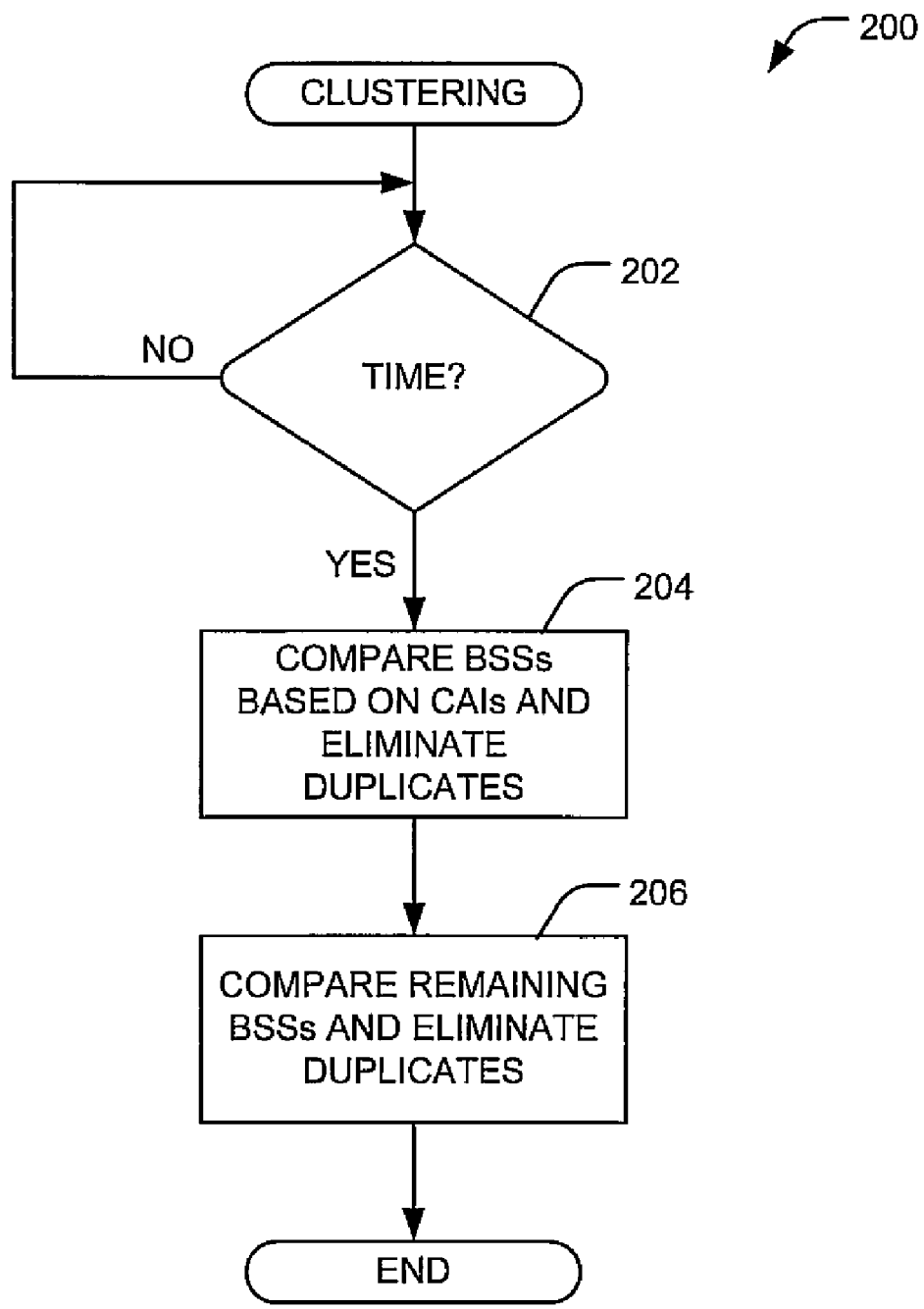

Content ancillary information can also be used during clustering performed by the monitoring equipment 10 and/or by the central facility 28 in order to cluster broadcast signatures corresponding to unknown programs. Unknown programs are those programs whose broadcast signatures did not favorably compare to any reference signatures stored in the reference signature library and/or which did not contain a program identifying code such as a media link. Accordingly, to implement clustering, the computer employed in the communication equipment 26 and/or the computer 32 of the central facility 28 may execute a software routine 200 shown in FIG. 5.

The time for clustering is determined at a block 202. For example, clustering by the monitoring equipment 10 and/or by the computer 32 may be performed periodically, such as once a day, or in response to an event such as a poll or an instruction from a user, or the like. When it is time for clustering as determined at the block 202, the broadcast signatures corresponding to one unknown program are compared to the broadcast signatures corresponding to other unknown programs at a block 204 based upon the content ancillary information associated with each set of broadcast signatures. Thus, all sets of broadcast signatures corresponding to the same first content ancillary information (e.g., CAI1) are compared to one another. Duplicates are then eliminated so that only one set of broadcast signatures corresponding to content ancillary information CAI1 is kept. Similarly, all sets of broadcast signatures corresponding to the same second content ancillary information (e.g., CAI2) are compared to one another, and duplicates are then eliminated so that only one set of broadcast signatures corresponding to content ancillary information CAI2 is kept. This process is repeated for each of the remaining content ancillary information. Then, each set of broadcast signatures which did not have a content ancillary information associated therewith is compared at a block 206 to all other remaining sets of broadcast signatures, including those remaining sets of broadcast signatures having content ancillary information associated therewith, and any duplicates are eliminated. As a result of the processing at the blocks 204 and 206, the remaining sets of broadcast signatures are unique and the software routine 200 ends. As a result, it is necessary to view an unknown program only once during new program discovery.

Certain modifications of the present invention have been discussed above. Other modifications will occur to those practicing in the art of the present invention. For example, the tuner 14 may be a tuner which tunes to a single channel so that a tuner 14 is required for each channel to be monitored. In this case, a multiplexer may be arranged to multiplex signals from some or all of the instances of the tuner 14 to the meter 17 so that each multiplexed output of the instances of the tuner 14 is processed in turn by the monitoring equipment 10. Alternatively, instead of multiplexing, each tuner 14 may be provided in its own set of monitoring equipment 10. On the other hand, the tuner 14 may be a scanning tuner for tuning to each of the channels available at the monitoring equipment 10, or the channels may be divided up between several scanning tuners or between a combination of scanning tuners and non-scanning tuners.

Also, as discussed above, the signature extractor 20 is arranged to extract signatures from the programs to which the tuner 14 is tuned. However, other program identifying data may be captured instead of, or in addition to, signatures. For example, AMOL codes may be detected. Also, the monitoring equipment may be arranged to prompt audience members to manually input a program identification in the event that a media link is not found in a program. In this case, the non-media link program identifying datum is the manually entered program identification.

Moreover, it is not necessary to delete from the log those broadcast signatures which are extracted from a program from which a media link is also detected. In this case, the block 58 may be eliminated.

Furthermore, as described above, the meter 17 operates in accordance with the software routine 50. However, the meter 17 may be implemented in hardware, in a combination of software or hardware, or the like.

In addition, detected media links as described above may be used to identify the programs received by a receiver and/or to verify that the programs have been transmitted as intended. However, the detection of media links may have many other uses. For example, the detection of media links also may be used to verify that the correct media links were transmitted in the correct programs, over the correct channels, at the correct times, in the correct numbers, etc.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An apparatus comprising:
   a meter to record a media link embedded in a commercial tuned by a tuner, the media link being activatable to retrieve content different from the tuned commercial from a content provider, the meter to further record at least one of a signature and a program identification code to identify the commercial, and the meter to timestamp at least one of the media link, the signature and the program identification code;
   a program identifier to identify the commercial based on at least one of the media link, the signature and the program identification code; and
   a computer to verify whether the media link was a correct media link to be broadcast with the identified commercial.

2. The apparatus of claim 1 wherein the media link is a URL.

3. The apparatus of claim 1 wherein the media link is a code referenced to a URL.

4. The apparatus of claim 1 wherein the media link is a trigger.

5. The apparatus of claim 1 wherein the media link is a hyperlink.

6. The apparatus of claim 1 wherein the computer is to verify whether the media link was transmitted at at least one of a correct time, on a correct channel, or a correct number of times.

7. A verification system comprising:
   a meter to create a log of URLs and program identifiers received via a tuner, the log including channel identifiers reflecting channels on which the URLs were received and timestamps reflecting times and dates on which the URLs were detected;
   a verification computer to process the log against a database to verify at least one of:
      whether at least one of the URLs was transmitted within an agreed time on an agreed channel; or
      whether the at least one of the URLs was transmitted in association with a predetermined program.

8. The verification system of claim 7 wherein the verification computer is to determine whether the at least one of the URLs was broadcast at least a predetermined number of times.

9. The verification system of claim 7 wherein the program is a commercial.

10. A verification system comprising:
    a meter to create a log of URLs and program signatures received via a tuner, the log including timestamps reflecting times and dates on which the URLs were detected;
    a program identifier to identify a first program based on at least one of a first URL and a first signature in the log;
    a verification computer to process the log against a database to verify at least one of:
       whether the first URL was transmitted within an agreed time on an agreed channel;
       whether the first program with which the first URL was transmitted with a predetermined program with which the URL was agreed to be transmitted; or
       whether the first URL was broadcast at least an agreed number of times.

11. The verification system of claim 10 wherein the program is a commercial.

* * * * *